United States Patent [19]

Maki

[11] Patent Number: 5,180,177
[45] Date of Patent: Jan. 19, 1993

[54] ADJUSTABLE WHEEL SUPPORT DEVICE

[75] Inventor: Donald F. Maki, P.O. Box 25707, Tempe, Ariz. 85285

[73] Assignees: Deborah Carla Macha; Donald F. Maki, Tempe, Ariz.

[21] Appl. No.: 717,673

[22] Filed: Jun. 19, 1991

[51] Int. Cl.⁵ .............................................. B62B 3/02
[52] U.S. Cl. .................................. 280/47.15; 280/14; 248/352
[58] Field of Search .................. 280/47.15, 767, 79.11, 280/762, 79.4, 14, 638, 35, 639, 651, 652, 47.131, 47.17, 47.19, 63; 248/352, 354.5

[56] References Cited

U.S. PATENT DOCUMENTS

| | | | |
|---|---|---|---|
| 2,493,295 | 1/1950 | Kron | 280/47.15 |
| 2,766,993 | 10/1956 | Reichelt | 280/79.11 |
| 3,317,218 | 5/1967 | Rivolta | 280/47.15 |
| 3,635,434 | 1/1972 | Chartier | 280/767 |

Primary Examiner—Richard M. Camby
Attorney, Agent, or Firm—Richard R. Mybeck

[57] ABSTRACT

A wheel support device having a base member, a pair of supporting arms attached to the base at each end thereof and attachable to a wheel hub in a common plane which extends through a longitudinal axis defined by the pivotal points of a pair of rotatable casters attached to the base member in spaced relationship to each other. Each caster assembly includes a protective skirt disposed to prevent the engagement between foreign objects and the casters.

7 Claims, 1 Drawing Sheet

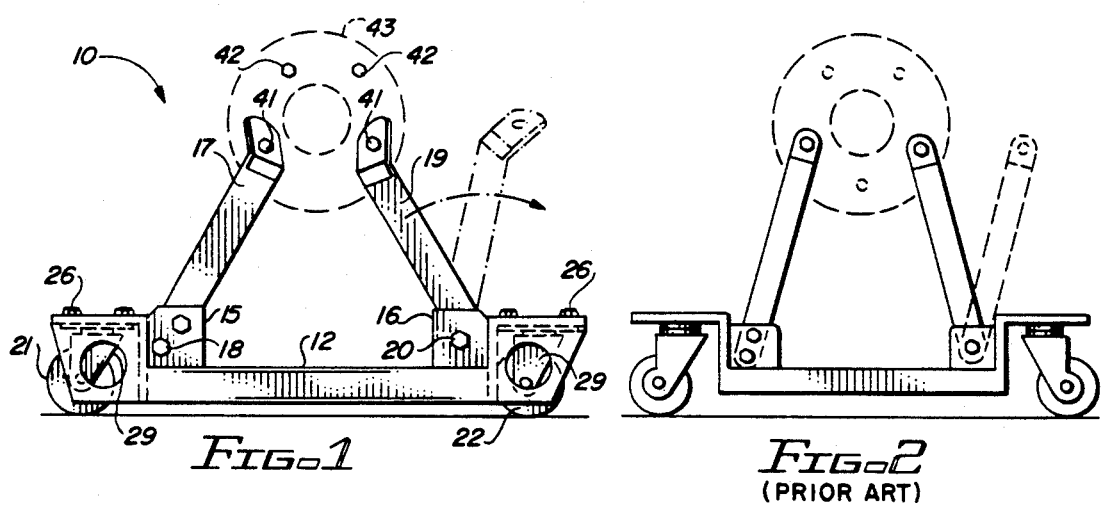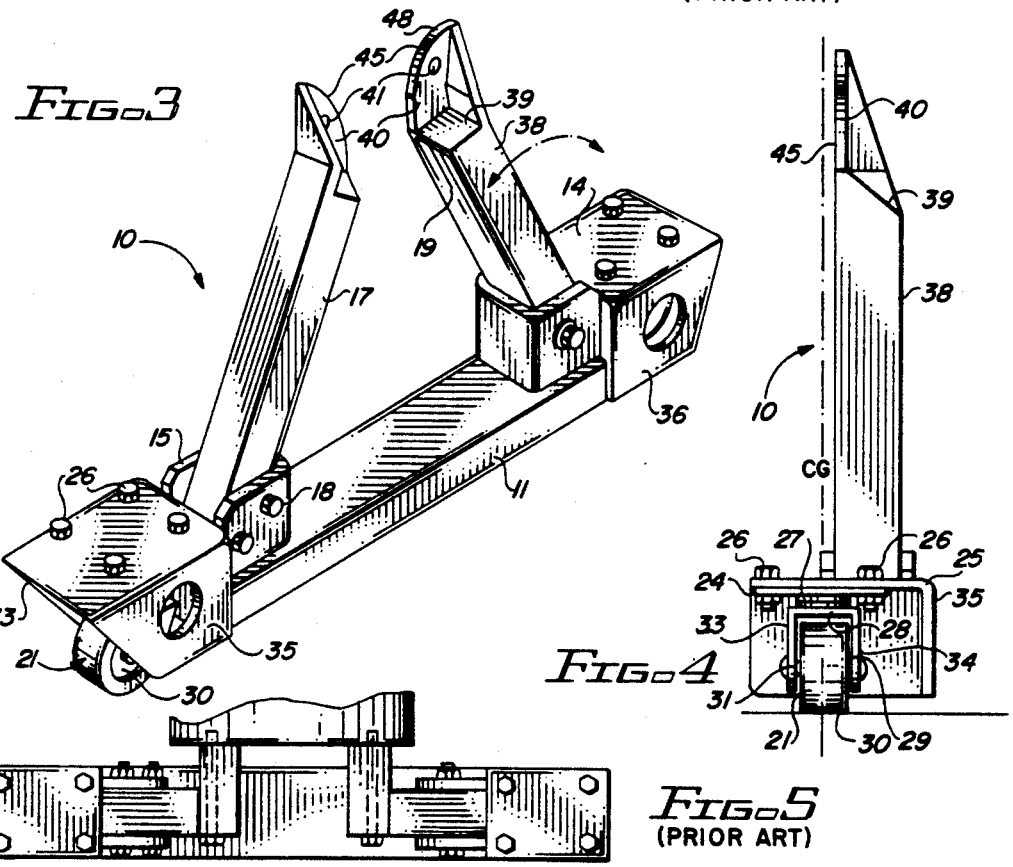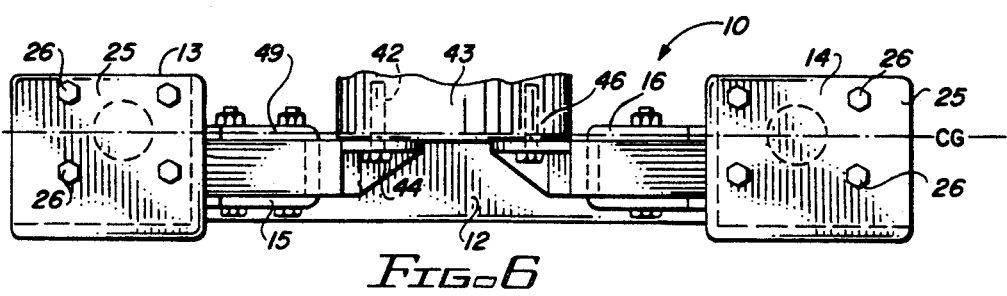

ADJUSTABLE WHEEL SUPPORT DEVICE

The present invention relates to a portable device for temporarily replacing the wheels of a wheeled vehicle in order to support the vehicle and enhance its mobility while that vehicle is being repaired, restored or otherwise serviced.

In the repair and/or restoration of wheeled vehicles such as automobiles and the like, it is frequently necessary to alter the position of the vehicle, either to facilitate access to electric power, better light or to change work areas. It has been found that the use of the vehicle's normal wheel configuration to achieve such a relocation is both inconvenient and impractical and, where shop space is relatively limited, essentially impossible.

BACKGROUND OF THE INVENTION

The prior art has attempted to provide several solutions to the basic need of supporting a wheeled vehicle with a device other than its road wheel, while the vehicle is repaired, restored or worked upon. As will appear, all have had problems associated with them and did not provide an ideal working condition.

For instance, the use of an ordinary jack failed to solve the problem because it cannot support a vehicle in a stable manner, and will not allow the vehicle when so supported to be moved. Damage to the vehicle and/or injury to the people working on a vehicle supported by an ordinary jack can easily result.

The use of a rolling hydraulic jack or floor jack was somewhat safer but it was also extremely difficult to relocate a vehicle because of the severe radial limitations provided by such devices. Nor did placing the vehicle so that it was supported by four hydraulic jacks solve the problem because movement would cause one or more of the jacks to become dislodged thereby potentially causing damage to the vehicle and/or injury to the mechanic.

Rivolta (U.S. Pat. No. 3,317,218) proposed a scissors-like support device having castors which can be attached in place of a wheel with the wheel lug nuts and an associated support plate which would support different types of vehicles at different heights. Rivolta's device suffered stability problems because of the distribution of the weight on the device and the excessive torque applied to the scissors joint when the vehicle so supported was moved in a direction other than in line with the plane of the device.

Chartier (U.S. Pat. No. 3,635,434) tried to solve the problem by providing a caster-mounted base plate having a pair of up-reaching arms for connection to the wheel lug bolts. Like Rivolta, Chartier had stability and safety problems which arose from the torque generated upon stress bearing parts of the device and the supported vehicle. Furthermore, Chartier provided only limited mobility when the supported vehicle was moved.

Thus a need still exists for a portable support device for replacing the wheels of a motor vehicle which provides enhanced mobility, stability and mechanic safety and simultaneously avoids the creation of adverse torque forces upon either the vehicle or the deivce so that further damage is avoided.

It is toward the solution of these needs that the present invention is directed.

BRIEF SUMMARY OF THE INVENTION

The present invention relates to a device capable of supporting a wheeled vehicle, for which an automobile will be used as typical, in a manner that is stable, secure, allows the vehicle to be moved in any direction easily, and provides access to those parts of the vehicle normally obscured by road wheels. A vehicle supported by four units of the present invention can be moved smoothly and safely in any direction on the casters that form an integral part of the device by gently pushing the vehicle in the desired direction including at right angles to the previous orientation.

The present invention comprises a metal base having an upper and lower surface and a proximal and distal end; a pair of supporting metal arms connected to said upper surface at each end thereof, one stationary and one pivotal. The base has a first and second rolling caster unit operatively secured to the lower surface of the metal base, one adjacent each end of the long dimension of the base. The supporting metal arms are so designed and mounted so that the mating surfaces thereof, as is hereinafter described, are the in the same vertical plane as the central longitudinal axis extending between the caster centers. This assures that all of the weight borne by the arms is transmitted to and hence supported along this axis thereby preventing the creation of any adverse torque forces upon the stress bearing parts of either the device or the supported vehicle. The upper end of each supporting metal arm has a hole drilled therein of a size suitable to receive and hold a vehicle lug bolt therein. This, as will appear, permits the device to be attached, and the vehicle supported, by using the existing lug bolt from the wheel and attaching the device thereto.

The present invention fulfills its desired purposes of safely supporting a wheeled vehicle and allowing the vehicle thus rupported to be easily moved thereby facilitating its repair and/or reconstruction in a remarkable fashion.

Accordingly, it is a principal object of the present invention to provide a device for supporting and relocating a wheeled vehicle that solves in a unique fashion all of the prior art problems while providing complete stability of the supported vehicle, both at rest and when moved in any direction.

Another object of the present invention is to provide a new and improved wheel support device for use on wheeled vehicles during alteration and/or repair thereof in which a planar interface between the device and the wheel hub of the wheel it replaces lies in a coplanar relationship with the longitudinal axis of the caster pivots and creates no torque therewith.

These and still further objects as shall hereinafter appear are fulfilled by the present invention in a remarkably unexpected manner as will be readily discerned from a careful consideration of the following detailed description of an exemplary embodiment thereof, especially when read in conjunction with the accompanying drawings in which like parts bear like indicia throughout the several views.

BRIEF DESCRIPTION OF THE DRAWINGS

In the drawing:

FIG. 1 is a side elevation of a wheel support device embodying the present invention;

FIG. 2 is a similar view of a support device of the prior art;

FIG. 3 is an isometric view of a wheel support device embodying the present invention having carrier means attached thereto;

FIG. 4 is an end view of the device as shown in FIG. 3;

FIG. 5 is a plan view of the prior art device; and

FIG. 6 is a plan view of the wheel support device embodying the present invention.

DESCRIPTION OF THE PREFERRED EMBODIMENTS

The wheel support device of the present invention as shown in FIGS. 1, 3, 4 and 6 is identified by the general reference 10 and comprises a base plate 11 having a central support portion 12, a first end portion 13 and a second end portion 14 disposed at opposite ends of support portion 12 and integrally formed therewith. Intermediate end portions 13, 14 and respectively contiguous therewith in spaced relationship to each other are U-shaped brackets 15, 16.

First support arm 17 is rigidly attached to first bracket portion 15 and secured thereto with a pair of suitable fasteners such as bolts 18 which maintain said arm 17 at an angle of about 68° relative to support portion 12.

A second support arm 19 is pivotally attached to second bracket 16 by a single fastener such as a bolt 20 for purposes to be hereinafter described in detail.

A pair of rotatable rolling casters 21, 22 are mounted within rectangular end portions 13, 14 respectively. Each caster, for example caster 21 as shown in FIG. 4, comprises an upper plate 24 which is secured to upper portion 25 of end portion 13 by suitable fasteners such as bolts 26. A central pivot member 27 extends generally perpendicularly from the upper surface 28 of U-shaped caster bracket 29 and includes a wheel member 30 mounted upon an axle 31 extending between opposite sides 33, 34 thereof spaced in generally parallel relationship to plate 24.

Caster 22 is constructed in the same manner as caster 21 and each is able to rotate a full 360 degrees about pivot member 27 as desired. Toe guards 35, 36 are secured as frontal plates to end portions 13, 14, respectively, and serve as protective skirts to restrict access to casters 21, 22 and protect a worker's toes from injury when a vehicle supported by device 10 is moved on wheel member 30.

Each support arm 17, 19, as described, is connected at its lowermost end within U-shaped bracket 15, 16, respectively, which brackets 15, 16 are in turn secured to support portion 12 in any suitable fashion as by welding.

Each arm member, for example arm 17, comprises a body portion 38, an intermediate portion 39 and an upper portion 40 having an opening 41 defined therethrough for receiving the lug bolt 42 from a conventional wheel hub 43 therethrough for secured engagement thereto. This engagement is accomplished by threading opening 41 over the lug bolt 42 which protrudes outwardly from wheel hub 43 and then using the accompanying lug nut 44 to secure arm member 17 to wheel hub 43 for most automobiles. However, in certain automobiles such as the Mercedes-Benz, the lug bolt 42 is detachably secured into the wheel hub 43 and must be withdrawn before the accompanying wheel can be removed. In such a case, opening 41 is aligned with the empty lug bolt bore and the lug bolt 42 is passed through opening 41 and screwed back into wheel hub 43 to secure arm member 17 to wheel hub 43.

Pivotal arm 19 is secured in a similar fashion after it is moved to align the opening 41 thereof with a corresponding lug bolt 42 (or lug bolt bore, as the case may be) and attaching lug nut 44 (or passing the lug bolt 42 therethrough into the wheel hub 43) and tightening the connection. Note that upper portion 40 of each arm 17, 19 presents a flat face 45 for mating with the outer surface 46 of the wheel shown in FIG. 6. Portion 40 contains a contoured edge 48 which is specifically contoured to clear the center protrusion of wheel hub 43 and angled to clear the external calipers and like wheel/brake appendages which are present on modern vehicles.

As shown in FIG. 1, each caster members 21, 22 include a vertically extending central pivot member 27, which coacts to define a longitudinal axis 49 therebetween. A salient feature of device 10, and one which clearly distinguishes it from the prior art device shown in FIGS. 2 and 5, arises from the fact that the plane of each flange face 45 and hence the engagement plane between flange faces 45 and the outer surface 46 of wheel hub 43, lies in the common vertical plane which projects through longitidunal axis 49 to provide torque-free stability to device 10 when in use.

Note that axis 49 is not central to base plate 11 but rather is central to casters 21, 22 which enables all of the weight supported thereby to fall in a common plane thereby preventing torque forces from being applied to device 10 or to wheel mount fastening means 42 when the supported vehicle is moved.

As previously described, arm members 17, 19 each have an opening 41 provided therethrough in the upper portion 40 thereof to permit secure connection to the supported vehicle using vehicle wheel lug bolts 42 which, as previously described, form an integral part of the vehicle wheel assembly. The same lug bolts or nuts which were used to secure the road wheel to the wheel hub 43 are used to secure support arms 17, 19 to the hub 43. The upper flange portion 40 of each support arm 17, 19 is contoured to permit device 10 to be mounted to a variety of vehicle wheel mount patterns in the same secure fashion without interference.

In practice, the road wheel is removed and the vehicle is supported at a suitable height to accommodate device 10. Device 10 is attached to the exposed wheel hub 43 by inserting one lug bolt 42 through the opening 41 in rigid arm 17, pivoting arm 19 into place and inserting another lug bolt 42 through the opening to permit opening 41 to align with the appropriate lug bolt 42. This procedure is preferably repeated at each wheel location until each wheel has been replaced by device 10. Of course, in certain applications only two devices 10 will be employed in which case only the front or the rear wheels will be replaced on the vehicle being serviced.

Device 10 is especially designed to allow them to be used in one or two pairs. A minimum of two units of device 10 are employed to replace either the front pair or the rear pair of vehicle road wheels. When used in pairs the front or rear of the vehicle is safely supported levelly at a height permitting access to vehicle parts repaired from beneath the vehicle.

In order to implement operation of the present invention it is necessary to remove, one at a time, from the selected wheeled vehicle, each road wheel of the vehicle which is desired to be replaced. This may be accomplished by any number of currently available methods. As each wheel is removed, device 10 is mounted in its place in the manner described herein. When installation is complete, the temporary vehicle support used to remove the wheel is removed and the vehicle weight is supported solely by devices 10.

When four units of the present invention are employed, both front and rear pairs of vehicle road wheels are replaced. This configuration allows the full advantages of the present invention to be realized. A vehicle so supported is maintained at a height which provides ready access to any portion of the vehicle. Furthermore, the vehicle so supported may be readily moved in any direction over the garage floor by simply pushing the vehicle in the direction desired.

Because all of the vehicle's weight is supported along the base axis 49 which joins pivot members 27 of caster members 21, 22, no torque forces are exerted either upon device 10 nor upon lug bolt 42 and damage to either device 10 and wheel hubs 43, even during vehicle movement, is totally avoided. Further, toe guards 35, 36 prevent casters 21, 22 from rolling over objects or toes that could otherwise be damaged by the weight of the supported vehicle.

From the foregoing, it becomes apparent that a new and useful device has been herein described and illustrated which fulfills all of the aforesaid objectives in a unique fashion. It is of course understood that such modifications, alterations, and adaptations as may readily occur to an artisan having the ordinary skills to which this invention pertains are intended within the spirit of the present invention which is limited only by the scope of the claims appended hereto.

Accordingly what is claimed is:

1. A wheel support device for attachment to a vehicle wheel hub by lug bolts associated therewith, said device comprising: a generally rectangular base member having an upper and a lower surface, each of said surfaces having a proximal, and distal end, a first edge and a second edge; a first pivotal center mounted to said lower surface of said base member adjacent said distal end; a second pivotal caster mounted to said lower surface of said base member adjacent said proximal end, the axis of rotation of each said casters intersecting the plane of said upper surface at a point, said points defining a longitudinal axis therebetween which is generally parallel to said first edge and said second edge and intermediate thereof; a first bracket mounted on said base member adjacent said distal end intermediate said first and said second casters; a second bracket mounted on said upper surface of said base member adjacent said proximal end intermediate said first and said second casters in spaced relationship to said first bracket; a first arm member rigidly attached to said first bracket and having an inner and an outer face surface defined thereon in spaced generally parallel relationship to each other, said inner surface being disposed in coplanar relationship to said longitudinal axis, said first arm member having an aperture defined therethrough between said surfaces for receiving a first wheel lug bolt in detachable secured relationship therewithin; a second arm member pivotally attached to said second bracket and having an inner and an outer face surface defined thereon in spaced generally parallel relationship to each other, said inner surface being disposed in coplanar relationship to said longitudinal axis, said second arm member having an aperture defined therethrough between said surfaces for receiving a second wheel lug bolt in detachable secured relationship therewithin, each said inner face surface of each said arm member being adapted to engage said wheel hub in surface-to-surface engagement therewith when said lub bolts extend into and through said apertures, said surface-to-surface engagement lying in coplanar relationship with said longitudinal axis.

2. A wheel support device according to claim 1 in which said first caster and said second caster are each pivotal through 360°.

3. A wheel support device according to claim 1 mounted to each of four wheel hubs on a common vehicle whereupon said vehicle is movable in any direction by pushing the vehicle in the desired direction.

4. A wheel support device according to claim 1 in which said inner face surface of each said support arm is contoured to avoid interference with extraneous parts contained on said wheel hub.

5. A wheel support device according to claim 1 having a protective skirt attached to said first and said second end portions to prevent foreign objects from engaging said pivotal casters.

6. A wheel support device according to claim 1 in which said first arm member coacts with said upper surface to define fixed included angle therebetween.

7. A wheel support device according to claim 6 in which said fixed included angle is 68°.

* * * * *